Aug. 17, 1965       E. W. BALLENTINE       3,201,620
TRIBOELECTRIC GENERATOR FOR IONIZING AIR
Filed Dec. 21, 1959                    4 Sheets-Sheet 1
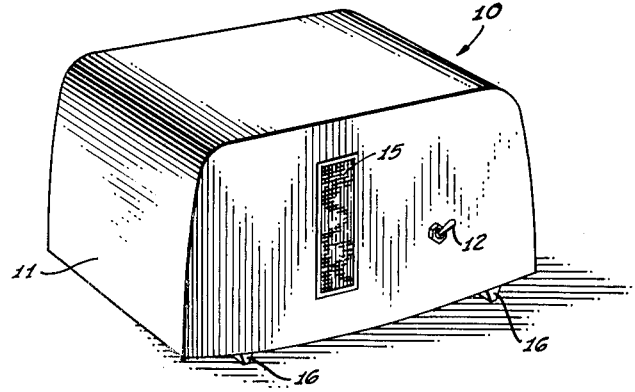
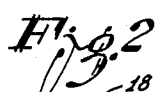
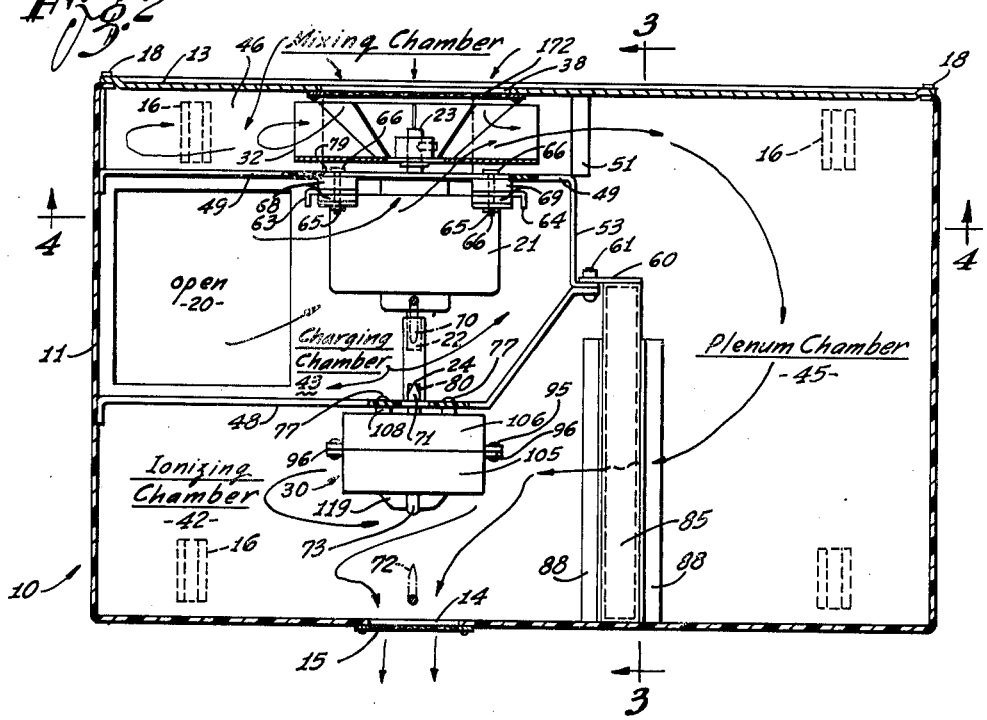
INVENTOR:
Earle W. Ballentine
Attorneys,

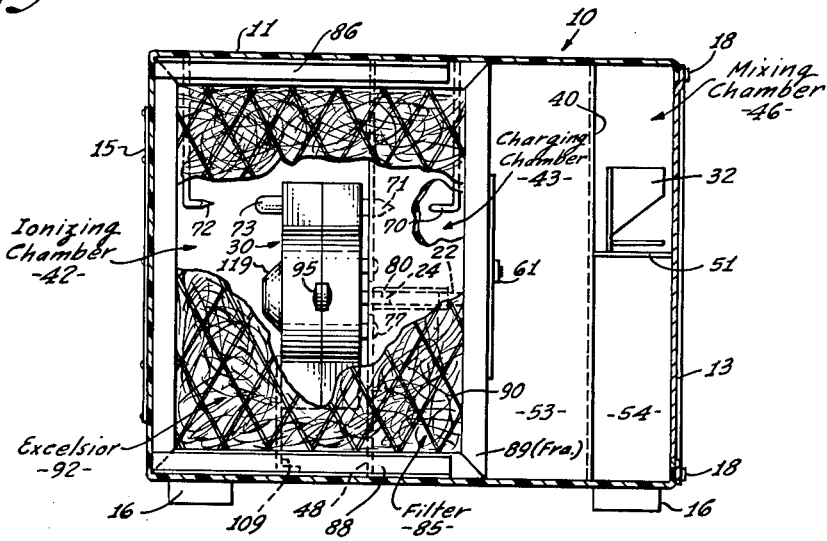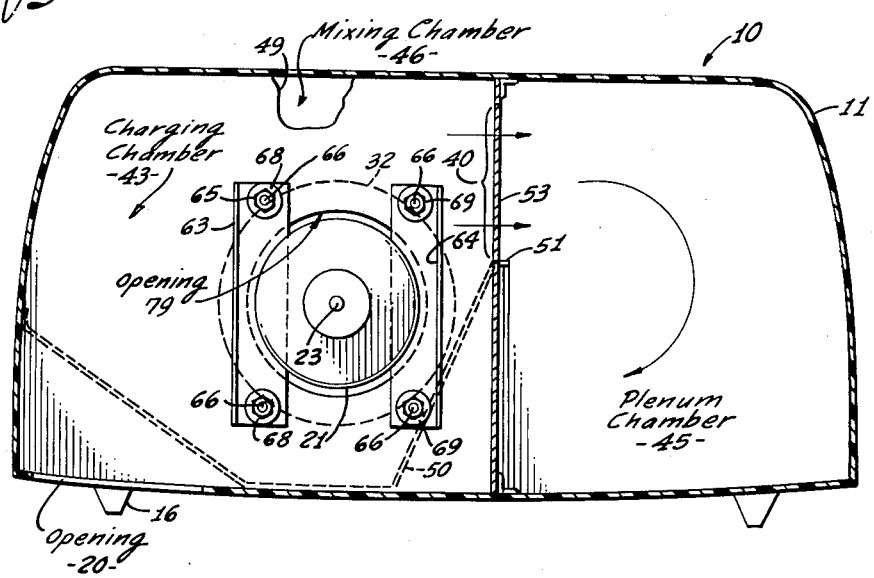

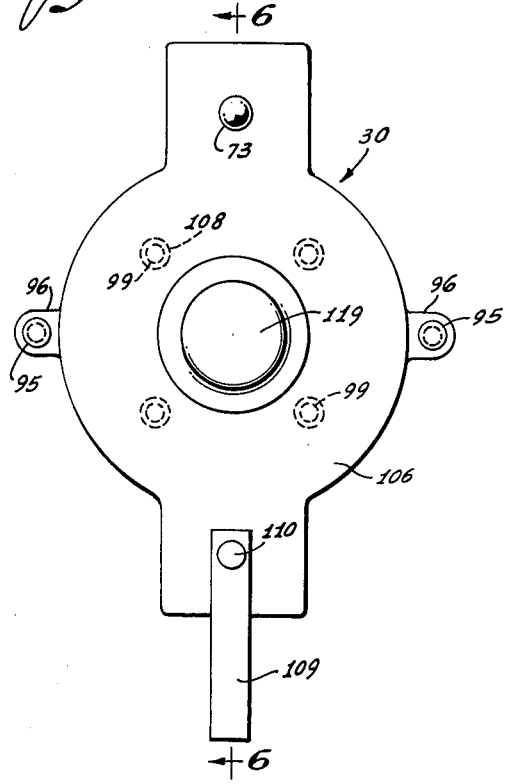
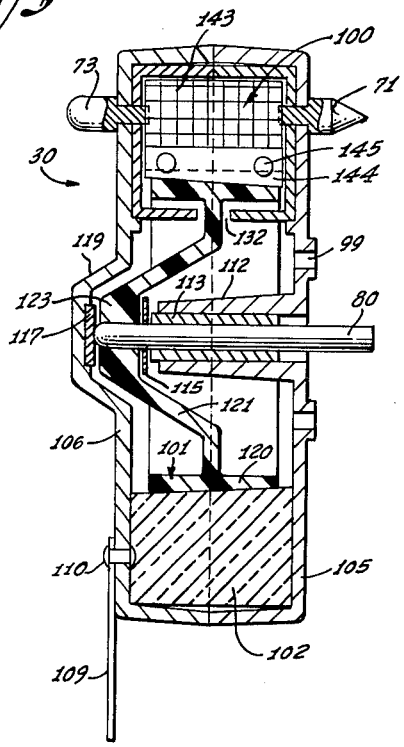
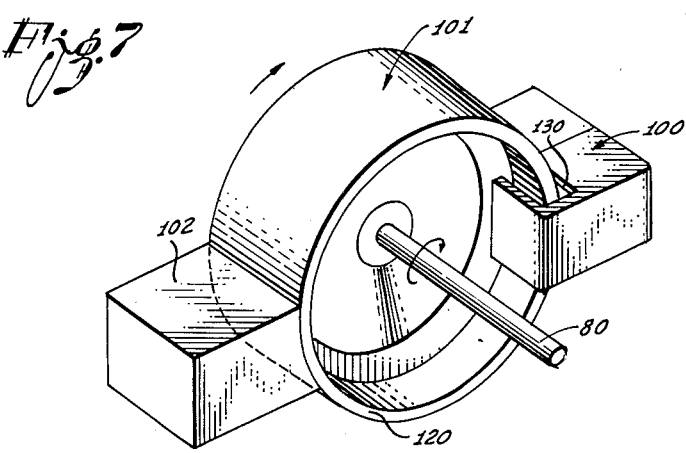
INVENTOR:
Earle W. Ballentine
Attorneys

Aug. 17, 1965   E. W. BALLENTINE   3,201,620
TRIBOELECTRIC GENERATOR FOR IONIZING AIR
Filed Dec. 21, 1959   4 Sheets-Sheet 4
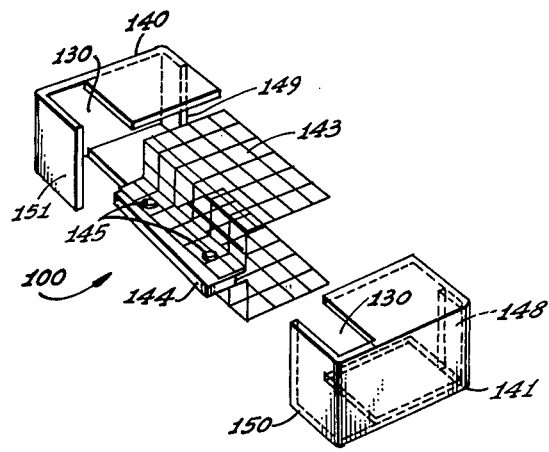
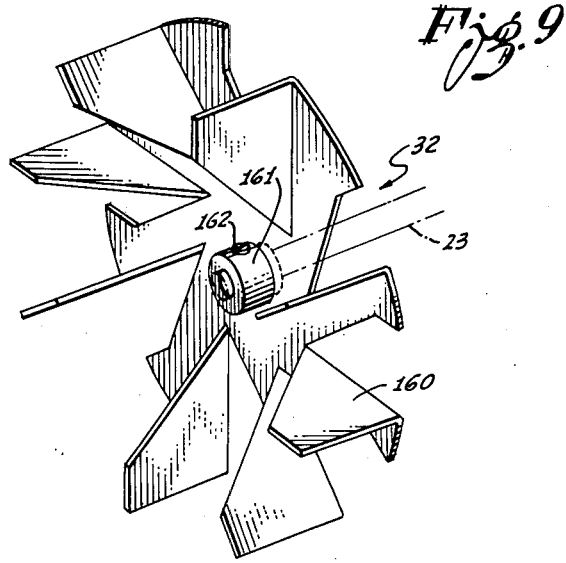
INVENTOR:
Earle W. Ballentine
By Smyth & Roston
Attorneys

United States Patent Office 3,201,620
Patented Aug. 17, 1965

3,201,620
TRIBOELECTRIC GENERATOR FOR IONIZING AIR
Earle W. Ballentine, 27 Packet Road,
Portuguese Bend, Calif.
Filed Dec. 21, 1959, Ser. No. 860,912
10 Claims. (Cl. 310—7)

This invention relates to an air ionizer and purifier and, more particularly, to an air ionizer and purifier which generates ions and utilizes the generated ions in a turbulent diffusion electrostatic filtering system to purify the air. The purified air from the filtering system is combined with negative ions and dispersed into the area served by the air ionizer and purifier.

Air is generally considered a relatively good insulator though a charged condenser in air slowly loses its charge. This discharge is due to the electric conductivity of the air produced by carriers of electrostatic charges referred to as ions. Ions are essentially particles, as atoms, molecules or molecule complexes, that have lost or gained a negative charge, or electron. When an electron has been lost, the residual ion is positively charged, and the free electron attaches itself to another particle producing a negatively charged ion. A negative ion is then a particle that has an extra electron, and a positive ion is a particle which has lost an electron. Very few gases readily form negative ions but oxygen, nitrous oxide and carbon oxide are some of the gases which do form negative ions at atmospheric pressures. Oxygen forming approximately one-fifth of the volume of air is the most common gas which can be readily negatively ionized.

It has become increasingly evident to the medical profession and to the public that the introduction of negative ions into air has a therapeutic and stimulating effect upon the individuals breathing the charged air. For example, in an article by Norman Carlisle in the Coronet magazine of September, 1959, on page 127, the utilization of negative ions is referred to as "New Magic in the Air" and described as having a therapeutic value for such conditions as asthma, hay fever, colds, etc. Although industrial researchers are fast becoming aware of the advantageous physiological and biochemical effects of negative ions, a number of ion generators have already been developed and are being used either as separate units or in conjunction with air conditioning systems.

The Patent 2,855,641, which issued on Oct. 14, 1958 to J. Stein, is illustrative of portable apparatus for generating negative ions. In the Stein apparatus, a number of ultraviolet lamps for producing ozone are utilized and, though not mentioned in the patent specification, a small amount of negative ions is also produced by the ultra-violet lamps. Apparatus utilizing ozone producing ultra-violet lamps of this type have a number of disadvantages. First, the ozone itself is ineffective to mask odors or as a sterilizing agent when utilized in safe percentages of 0.01 to 0.05 part per million of air. If utilized in greater percentages, there is a likelihood of causing distress. Secondly, the use of ultra-violet rays to produce the negative ions is generally inefficient, and the ultra-violet lamps have relatively short lives. In fact, the negative ions production properties of these lamps decrease quite rapidly with age, and even though the lamps appear to the viewer to be operating, the production of negative ions may have halted. In addition to these disadvantages, the utilization of ultra-violet radiation to produce negative ions may be harmful, because any hydro-carbons in the air may become activated by the ultra-violet radiation to produce smog.

Apparatus for generating negative ions has also been described in which a vaporization process of a charged liquid is utilized to produce the negative ions. Other apparatus utilizes a high D.C. corona discharge generated by a transformer and selenium or vacuum tube generators. These vaporizing and corona discharge apparatus are inefficient and expensive. Other types of apparatus have been utilized, but a practical, inexpensive and efficient negative ion generator has not been developed to date.

In a specific illustrative embodiment of this invention, an air ionizer and purifier is provided which utilizes a triboelectric generator for efficiently producing positive or negative ions. The triboelectric generator is at least 300 times as efficient as ultra-violet negative ion generators of equivalent size and utilizes considerably less electrical power for its operation. Moreover, expensive components such as transformers, rectifiers, ultra-violet lamps, etc., utilized in some of the prior generators are not required.

The word triboelectric is descriptive of an effect produced by contact potential differences between different insulating materials which can result in large residual charges. The lack of conductivity of the materials means that each small section of one insulating material that comes in contact with the other material will acquire its own local charge and potential. In order to transfer any considerable amount of charge, there must be a large area of contact, generally provided by rubbing the two materials together. For example, if glass, one insulating material, is rubbed with silk, a second insulating material, the glass becomes positively charged and the silk becomes negatively charged. Glass and silk are at different positions in a triboelectric series listing the various materials providing for this effect in an arrangement with each material becoming positively charged by the succeeding materials in the series.

The triboelectric generator utilizes this triboelectric effect to develop relatively high potentials for ionizing the oxygen in the air. The generator includes a rotatable member made of insulating material at one end of the triboelectric series of materials and a stationary resilient member made of material at the other end of the triboelectric series. The stationary member frictionally engages the rotatable member. Due to the frictional engagement, the rotatable member becomes charged in a direction of one polarity and the resilient member becomes charged in a direction of opposite polarity.

Features of this invention relate to the provision of means for removing the triboelectrically developed charge from the resilient member to permit a continuous potential accumulative operation. The resilient material, which may be fibrous mesh, supports a conductive material through which the generated charges are removed. In addition to the opposite charges developed on the two members, a layer of ionized air is developed in the porous structure of the fibrous mesh at the surface of the rotatable member. The ionized layer is charged in the same direction as the resilient member and is carried along as a boundary layer due to the drag of the rotatable member.

Further features of this invention pertain to the provision of a hollow electrode enclosing a portion of the charged surface of the rotatable member and into which the charged boundary layer of air is carried. The electrode has particular characteristics providing for a zero field in its interior and has conductive material in the form of a mesh to which the charged layer of air is directed and passes thru. Both the zero field and the mesh facilitate removal of the charge from the ionized layer. The resilient member forms, in this manner, one electrode and the hollow electrode the other, across which a substantial potential difference is developed. The direction of the potential difference depends upon the triboelectric relationship of the resilient and the rotatable members.

One of the two electrodes across which the potential is developed may be grounded and the other electrode may be coupled to a pointed electrode which functions to ionize the air. The pointed electrode is coupled to the electrode which is negatively charged in order to develop negative ions and it is coupled to the electrode which is positively charged to develop positive ions.

The highly efficient triboelectric generator is included as an integral element of an electrostatic dust precipitator. Heretofore, electrostatic dust precipitators have been bulky and expensive utilizing high potential wires for generating a corona discharge to charge the dust, and then attracting the charged dust to precipitator plates or tubes which are oppositely charged. The electrical power consumption of these precipitators for charging the wires, plates, etc., is appreciable. In the illustrative embodiment of this invention, positive ions are generated by the low electrical capacity triboelectric generator, and the generated positive ions are utilized to charge the dust by a turbulent diffusion process. The capacity of the generator is small compared to that of conventional precipitators because the ions are produced in a stream of atmospheric air by a silent electrical discharge without glow or visible corona. A substantial quantity of ions are generated by moving the air adjacent the pointed electrode of the triboelectric generator.

The turbulent diffusion is provided by a centrifugal fan which mixes the small amount of primary air, including the positive ions, with a large amount of secondary air sucked into the purifier. The turbulence is substantial to diffuse the charge so that the dust particles in the secondary as well as in the primary air become positively charged.

The fan directs the air through a filter mesh which is oppositely charged and accordingly which attracts the charged dust. Features of this invention relate to the provision of a disposable filter which precipitates the dust by a combination of impingement and electrostatic operation. The advantages of both types of filtering are attained. The filter includes a fibrous mesh which can be coarse, illustratively being a wood fiber mesh. The fibers are coated with a conductive material for electrostatically holding the charged dust. The conductive material also serves as an adhesive for activated carbon particles which remove any odor vapors present in the air directed through the filter.

Further advantages and features of this invention will become apparent upon consideration of the following description when read in conjunction with the drawing wherein:

FIGURE 1 is a perspective view of the air ionizer and purifier of this invention;

FIGURE 2 is a top view of the air ionizer and purifier of this invention with the top removed and the cabinet sectionalized;

FIGURE 3 is a sectional view of the air ionizer and purifier of this invention taken along lines 3—3 of FIGURE 2 with a portion of the filter removed;

FIGURE 4 is a sectional view of the air ionizer and purifier of this invention taken along lines 4—4 of FIGURE 2 illustrating the air passageway formed adjacent the fan;

FIGURE 5 is a front view of the triboelectric generator of this invention;

FIGURE 6 is a sectional view taken along lines 6—6 of FIGURE 5 illustrating the components utilized in the triboelectric generator of this invention;

FIGURE 7 is a pictorial view of some of the main components utilized in the triboelectric generator of this invention;

FIGURE 8 is an exploded pictorial view of one of the electrodes utilized in the triboelectric generator of this invention; and FIGURE 9 is a pictorial view of the centrifugal fan blade utilized in the air ionizer and purifier of this invention.

Referring first to FIGURES 1 and 2, an air ionizer and purifier 10 has a housing or cabinet 11 enclosing its various components. The material forming the housing 11 may be electrically conductive, illustratively of aluminum or steel. The housing 11 may also be made of plastic and have at least in part metalized surfaces. The housing 11 is supported by four legs 16 and has a rear panel 13 affixed to its side walls by means of a number of screws 18. At the front of the cabinet 11, a grill 15 covers a rectangular vertically aligned opening 14 from the interior of the housing 11. The housing 11 has two additional openings 20 and 38 in addition to the opening 14. The opening 20 is a rectangular shaped ingress opening at the bottom of the cabinet and the opening 38 is a circular ingress opening in the back panel 13 of the cabinet 11. As is further hereinafter described, when the air purifier 10 is operating, air is entered through the openings 20 and 38 and exited through the opening 14 in the front of the cabinet 11.

The operation of the air ionizer and purifier 10 is initiated by a switch 12 which is positioned on the front of the cabinet 11. When the switch 12 is operated, it energizes a motor 21 in the cabinet 11. The motor 21 may be an alternating current motor operating at a speed of approximately 1500 revolutions per minute. The power requirements of the air ionizer and purifier 10 are relatively small because the motor 21 is the only component in the purifier 10 requiring external power. The motor 21 is included in a charging chamber 43 which is one of a number of chambers 42, 43, 45 and 46 in the housing 11. These four chambers 42, 43, 45 and 46 are formed by a number of panels 48, 49 and 54 (FIGURE 3) and a filter 85. The panels 48, 49 and 54 may be made of a conductive material and the conductive material may be coated with an insulator material. The panels 48, 49 and 54 may also be made completely of conductive materials, or completely of insulator materials such as of plastic. As illustrated in FIGURE 2, the panels 48 and 49, which extend from the top to the bottom of the housing 11, form the charging chamber 43. The panel 48 also forms one side of the ionizing chamber 42 at the front of the cabinet 11 and the filter 85, which is hereinafter described in detail, forms a second side of the chamber 42.

The ionizing chamber 42 includes a triboelectric generator 30 which is driven by the motor 21. A motor shaft 22 of the motor 21 is coupled to a generator shaft 80 of the triboelectric generator 30 by a rubber tube 24. The tube 24 is in the charging chamber 43 with the motor 21, and the shaft 80 of the generator 30 extends through the panel 48 into the chamber 43. The tube 24 may be made of silicon rubber which has a relatively high specific resistivity, illustratively of $10^{15}$ ohms per centimeter. Butyl rubber, which has a similar high specific resistivity, may also be utilized. A high resistivity rubber is utilized for the tube 24 because the triboelectric generator 30 is insulated from the various surrounding components in the housing 11 except for an electrical connection through a terminal strip 109 shown in FIGURE 3. As is hereinafter described in detail, the triboelectric generator 30 generates positive ions in the charging chamber 43 and negative ions in the ionizing chamber 42.

The generator 30 is mounted by four set screws 77 to the panel 48 being spaced from the panel 48 by small cylindrical bushings 108 which may be integral with a casing section 106 partially enclosing the generator 30. The bushings 108 and casing section 106 are further hereinafter described in reference to FIGURES 5 and 6. The screws 77 may be made of insulating material such as a plastic so that the triboelectric generator 130 is connected solely by high resistivity insulating material to the panel 48.

The motor 21, which as described above, drives the generator 30, is supported on the panel 49 by means of two brackets 63 and 64, shown particularly in FIGURE 4. The brackets 63 and 64 are separated from the panel 49 by a number of resilient rubber bushings 68 and 69 and attached thereto by four bolts 66 engaged respectively by four nuts 65. The bushings 68 separate the nuts 65 from the bracket 63 and the bracket 63 from the panel 49. The bushings 69 separate the nuts 66 from the bracket 64 and the bracket 64 from the panel 49. The motor 21 is supported in this manner in a spaced relationship from the panel 49.

The panel 49 forms a circular opening 79 which is concentric with the longitudinal axis of the motor 21. The motor 21 has a second driving shaft 23 facing in a direction opposite to that of the shaft 22 and extending through the opening 79 into the chamber 46. The driving shaft 22, as described above, is coupled to the triboelectric generator 30, and the driving shaft 23 is coupled to a centrifugal fan 32. The fan 32 is enclosed in a volute casing which also serves as the mixing chamber 46. As is hereinafter described in detail, the centrifugal fan 32 functions to force a relatively small amount of air entering through the bottom opening 20, through the charging chamber 43 into the mixing chamber 46 where it is mixed with a relatively large amount of air entering through the circular opening 38 in the back panel 13. As indicated by the directions of the arrows in FIGURE 2, the mixed air is then provided through an opening 40 between the panel 54 and the top of the housing 11. The opening 40, illustrated in FIGURES 3 and 4, provides an air passageway from the mixing chamber 46 to a plenum chamber 45 where the air is further mixed and then passed through the filter 85 into the ionizing chamber 42. As described above, the ionizing chamber 42 includes the triboelectric generator 30 which introduces negative ions to the filtered air. From the ionizing chamber 42, the air is forced out through the opening 14 at the front of the housing or cabinet 11. The function of each of the chambers 42, 43, 45 and 46 will be further hereinafter described as each performs an important function in the operating sequence of the air ionizer and purifier 10 of this invention.

Before proceeding with the descriptions of these chambers 42, 43, 45 and 46, the operation of the triboelectric generator is first described in detail. As mentioned above, the triboelectric generator 30 is functionally a double generator because it generates ions both in the charging chamber 43 and in the ionizing chamber 42. The function of the ions in these two chambers is different, as is also hereinafter described. Referring to FIGURES 5 through 8, the triboelectric generator 30 has two casing sections 105 and 106 which fit together and seal the enclosed components. Actually, there are a number of openings through the casing sections 105 and 106 but these too are sealed by other components, as is hereinafter described.

The casing sections 105 and 106 are sealed in order to prevent any dust or other impurities from entering the generator 30. The casing sections 105 and 106 may be made of a high resistivity insulating material such as an olefin polymer polyethylene which is designated as Marlex 50 and manufactured by the Phillips Chemical Company of Bartlesville, Oklahoma. The characteristics of the Marlex 50 plastic are further described in reference to an insulator member 101 in the generator 30 which may also be made of the Marlex 50 plastic.

Each of the casing sections 105 and 106 has a pair of ears or extensions 96 which mate with the extensions 96 of the other casing section. The mating extensions 96 are attached together by screws 95 to force the two sections together. The plastic casing sections 105 and 106 may be heat sealed at their junction to form an airtight enclosure.

When the generator shaft 80 is rotated by the motor 21, a cylindrically shaped member 101, briefly mentioned above, which is mounted on the shaft 80, rotates therewith. The member 101 is made of one of two triboelectric voltage materials utilized in the generator 30. The other material forms a resilient member 102 which frictionally engages the external surface of the member 101.

As indicated above, triboelectricity is an effect produced by contact potential differences between insulating materials and can result in large residual charges. The lack of conductivity means that each small section of one insulating material that comes into contact with the other will acquire its own local charge and potential. The materials forming the two members 101 and 102 may be at opposite ends of a triboelectric series which lists the various insulating materials in accordance with the different contact potentials developed therebetween. A triboelectric series is defined in the text "The Physics of Electricity and Magnetism" by W. T. Scott, published in 1959 by Wiley as a list whose order is that of decreasing work function. This indicates that the materials are listed in an order such that each material becomes positively charged when rubbed by any material lower in the list. Conversely, each material becomes negatively charged when rubbed with any material higher in the list.

The cylindrical member 101 has the following desirable characteristics: First, it has a high electrical resistivity so that a charge developed at a point on its periphery will not disperse; second, it has a solid, stable structure; and, third, it has a low coefficient to friction to reduce the power requirements for moving it in frictional engagement with the member 102 and to prevent it from rapidly wearing out with use.

There are a number of materials which meet these characteristics, with the following being illustrative:

(1) Fluorocarbon resins, illustratively of the type designated as Teflon and manufactured by E. I. du Pont de Nemours and Company of Wilmington, Delaware;

(2) Halofluorocarbon resins, illustratively of the type designated Kel-F and manufactured by the Minnesota Mining and Manufacturing Company of St. Paul, Minnesota; and (3) Olefin polymer polyethylene, illustratively of the type designated as Marlex 50 and manufactured by the Phillips Chemical Company of Bartlesville, Oklahoma.

Of these three materials, Marlex 50, which was briefly described above, is presently the cheapest. The Marlex 50 polyethylene is a high density material having a high softening temperature, high tensile strength and low permeability. The volume resistivity of the Marlex 50 is approximately $6 \times 10^{15}$ ohms per centimeter. The high density, or low porosity, is due to the fact that Marlex 50 polyethylene is essentially crystalline. The high density structure provides for a low coefficient of friction at the peripheral surface of the cylindrical member 101. The present invention is not restricted to the utilization of the three materials tabulated above as any material having a high electrical resistivity and being displaced in the triboelectric series from the material forming the member 102 may be utilized.

The cylindrical member 101 has a central hub section 123 which is affixed to the end of the shaft 80. The member 101 also has a truncated cone shaped portion 121 which connects and supports a cylindrical portion 120 on the hub section 123. The outer surface, or periphery, of the cylindrical portion 120 bears against the resilient member 102 as the shaft 80 and the member 101 are rotated by the motor 21. The shaft 80 is supported in a cylindrical porous bronze bearing 113 impregnated with oil. The bearing 113 fits into a cylindrical extension 112 which is integral with the casing section 106. The bearing 113 is separated by a washer 115 from the inside surface of the central portion 123 of the member 101. The washer 115 is carried around with the hub section 123 and bears against the end of the bearing 113. In this manner, the washer 115 prevents the bronze bearing 113 from rubbing against the inside of the hub section 123. The end of the shaft 80 is positioned against a thrust porous bronze bearing 117 that is supported on the inside of a protruding circular area 119 of the casing section 106. As the shaft 80 and member 101 rotate in the enclosing casing sections 105 and 106, the shaft 80 rotates in the bearing 113 with its end against the thrust bearing 117. There is no moving contact between an insulator material such as of the member 101 or of the sections 105 and 106 with either of the bearings 113 and 117.

The material forming the member 102 is resilient to provide for continuous frictional contact of substantial area at the portion of the peripheral surface of the cylindrical member 101 passing adjacent thereto. The material forming the cylindrical member 101 may be at the negative end of the triboelectric series in that it becomes relatively negatively charged when contacted by a triboelectric material at the other end of the series. Suitable materials at the positive end of the triboelectric series are illustratively glass, wood, asbestos, hair and felt. In the specific illustrative embodiment of this invention, the resilient material 102 may be fiberglass with the glass fibers having diameters illustratively of 5 microns. Though, as depicted in FIGURE 7, the resilient member is rectangularly shaped, the enclosure for the resilient member 102 does not contact the peripheral surface of the cylindrical member 101. The fiberglass mesh forming the resilient member 102 is in frictional engagement with the peripheral surface of the cylindrical member 101. The resilient member 102, though made of fiberglass, is conductive in order to remove the charges developed by the frictional engagement of the fibers with the peripheral surface of the member 101. The fiberglass is partially coated with a conductive material which, illustratively, may be an organic substance carbonized at a temperature of approximately 425 degrees Fahrenheit. The organic substance may, illustratively, be sugar water. The current through the resilient member 102 is quite small so that a poor conductor such as a carbonized organic substance may be utilized. Other substances which may be utilized are India ink or any metallic substance. For example, gold chloride in solution may be deposited on the glass fibers and then heated to approximately 575 degrees Fahrenheit to decompose the chlorene leaving the gold on the glass fibers. Carbon, however, as indicated above, is acceptable and can be produced at lower temperatures. The coated fiberglass forming the resilient member 102 is electrically coupled by a rivet 110 to a terminal strip 109. The terminal strip 109, as illustrated particularly in FIGURE 3, is grounded to the metallic housing 11. The resilient member 102 is, in this manner, essentially at the potential of the housing 11 during the operation of the triboelectric generator 30.

The magnitude of the charge developed at the glass fibers and at the surface of the cylindrical member 101 as the member 101 rotates against the resilient member 102, depends upon the speed of rotation, the area of frictional engagement between the two members 101 and 102, and the charge developed per unit area. The charge developed per unit area depends upon the particular materials forming the members 101 and 102 and their relationship in the triboelectric series of materials.

Due to the thinness of the glass fibers, an intense field is created about them by the positive electrical charges generated by the frictional engagement of the threads with the surface of the cylindrical member 101. The surface of the cylindrical member 101 is comparatively flat so that an intense negative field thereat is not developed. The appearance potential for positive nitrogen ions is approximately 24.9 volts and nitrogen constitutes approximately four-fifths of the air by volume. Electrons formed in the air surrounding the positively charged fibers either by the small leakage from the surface of the member 101, or various ionizing radiations always present, are attracted to the fibers and, as they reach the high-field region proximate to the fibers, they establish electron avalanches. These avalanches maintain a highly energized state in the immediate vicinity of the fibers. The positive ions formed by the electron avalanches to the fibers are repelled from the fibers and from each other moving away from the fibers in a decreasing field. Due to collisions between the positive ions with other positive ions and with neutral atoms in the air, they gain little energy from the low field at the surface of the member 101. Even though some of the positive ions from the high-field at the glass fibers, therefore, may reach the surface of the member 101, few electrons are emitted by the positive ion bombardment. By far, most of the ions in the spaces between the fibers forming the resilient member 102 and the surface of the member 101 are positive ions.

In this manner, though the appearance potential of oxygen is only minus 19.3 volts, which is less in magnitude than the appearance potential of nitrogen, it is essentially positive ions which are generated in the small pockets formed by the glass fibers at the surface of the member 101. As the cylindrical member 101 rotates, a thin layer of air adjacent its surface is carried along in a laminar flow. At the illustrative speed of 1500 revolutions per minute, the critical Reynolds number is not exceeded so that the flow is a laminar, not turbulent, in nature. The Reynolds number is a dimensionless number which is equal to the ratio of the inertia force of the fluid to its friction force. If the speed of the motor 21 is increased materially to increase the inertia force of the positive ions in the thin boundary layer, the critical Reynolds number is exceeded and the flow becomes turbulent. The positive ions are carried around with the moving surface of the member 101 when the flow is turbulent as well as when it is laminar but the thickness of the boundary layer increases from the resilient member 102 to an electrode 100 at a greater rate. For both laminar and turbulent flow, the boundary layer is quite thin at the resilient member 102 and increases as it is dragged along by the cylindrical member 101. The boundary layer carried along by the member 101 at the electrode 100 may be approximately 0.180 inch which is closed to 3/16 of an inch thick. The positive ions, therefore, generated in the pockets between the glass fibers and the surface of the cylindrical member 101 are carried along in the boundary layer with the cylindrical member 101 as it rotates in a clockwise direction as depicted in FIGURE 7. The positive ions may actually form only part of the boundary layer and not occupy its entire width. Illustratively, the positive ions may mostly be in the area within 1/32 of an inch from the surface of the cylindrical member 101. By increasing the rotating speed of the cylindrical member 101, the critical Reynolds number may be exceeded so that the flow becomes turbulent but still most of the electrons remain within a small distance from the surface of the cylindrical member 101. By increasing the rotating speed, the amount of charge, carried to the electrode 100 is, accordingly, increased.

The boundary layer of positive ions is carried from the resilient member 102 to the electrode 100 at the other side of the cylindrical member 101. The electrode 100 is positioned across the member 101 from the member 102 to space them by a maximum distance. If the electrode 101 is closer to the member 102, the electrical leakages through the generator 30 are greater. The separation is required moreover to develop the electrostatic potential difference. The positive ions in the boundary layer are carried along both due to the laminar flow and also because they are electrically bound to the surface of the cylindrical member 101. As described above, the charge developed at the surface of the cylindrical member 101 is negative whereas the charge developed at the glass fibers in the resilient members 102 is positive. The negatively charged surface of the cylindrical member 101 attracts the positive ions in the boundary layer carried along with the rotating surface. The collisions of the high density positive ions in the boundary layer prevent them from quickly recombining with the negatively charged surface. If the cylindrical member 101 is not rotated at a sufficient speed, the positive ions will combine with the negative surface of the member 101 before they can reach the electrode 100. The centrifugal effect of the rotation on the boundary layer has a minor effect for preventing the ions from combining with the negatively charged surface of the member 101.

As is hereinafter described, the electrode 100 functions to remove the positive charge from the boundary layer which is carried along the surface of the cylindrical member 101 and through an opening 130 into the electrode 100. With positive ions being formed at the glass fibers adjacent the cylindrical member 101, a negative ion current is provided through the resilient member 102, the rivet 110 and the terminal strip 109 to the chassis 11 of the air ionizer and purifier 10.

The electrode 100, as shown particularly in FIGURE 8 as well as in FIGURES 6 and 7, includes two sections 140 and 141 which fit together and enclose a mesh 143 made of conductive material. The mesh 143 is attached by means of two rivets 144 to a strip of insulating material 144 which may, illustratively, be made of the same insulating material as the member 101. For example, the strip 144 may be made of Teflon or Marlex 50. The strip 144, as illustrated in FIGURE 6, engages the peripheral surface of the cylinder portion 120 of the cylindrical member 101. A triboelectric effect does not occur between the strip 144 and the cylindrical member 101 because they are made of similar materials. The function of the strip 144 is to direct the boundary layer of high density positive ions which pass through the opening 130 into the electrode 100 to the conductive mesh 143 and to reduce leakage of charge from the mesh to the cylindrical member 101. The insulator strip 144 may be perpendicularly aligned with respect to the surface of the cylindrical member 101 so that the boundary air is directed away from the negatively charged surface to pass thru the conductive mesh 143. The opening 130 into the electrode 100 is formed by the flanges 150 and 151 formed as integral parts of the sections 140 and 141. The flanges 150 and 151 fit around the cylinder portion 120 of the member 101 so that the cylinder portion 120 passes through the opening 130 into the electrode 100 and out of a corresponding opening 130 at the other side of the electrode 100. The negative charges on the peripheral surface of the cylinder 120 are not disturbed by the operation of the electrode 100 but the positive charges carried by the positive ions in the boundary layer are picked up by the electrostatic attraction of the conductive mesh 143.

The insulator strip 144 has an additional function of mechanically balancing the cylindrical member 101. The strip 144 is in frictional contact with the surface of the member 101 being urged against it by the conductive mesh 143. The resilient member 102 is also in frictional engagement with the member 101 but on its other side. The two forces exerted by the member 102 and by the strip 144 of the electrode 100 balance each other so that the cylindrical member 101 remains dynamically balanced.

The space formed at the opening 130 between the electrode 100 and the peripheral surface of the cylindrical member 101 is approximately ⅛ of an inch to permit the entry of the positive ions in the boundary layer. As described above, substantially all of the positive ions are within ⅛ of an inch from the surface of the member 101 for both turbulent and laminar flow. The size of the opening 130 is made as small as possible in order to facilitate the provision of the minimum electric intensity effect on the inside of the electrode 100. This effect is the same effect utilized in the Van de Graff generator to remove the charges from a strip of insulating material at the center of a huge sphere. The utilization of an enclosing structure to provide for substantially zero electric intensity in the structure to facilitate the transfer of a charge brought into the structure to the outside of the structure is also demonstrated by the famous Faraday's ice-pail experiment. The effect is that a charge in an enclosed conductive member induces an equal and opposite charge on the inside surface of the member, which induced charge cancels the electric field produced by the enclosed charge. The resultant electric intensity within the member is zero and a charge equal to the enclosed charge and of the same polarity is developed on the outside of the enclosing member. It is evident that a charge cannot exist in a fully enclosing conductive structure. In this manner, a charge brought into a fully enclosed member can be fully transferred to the outside of that member.

In the electrode 100, it is desirable to fully transfer the positive charge brought in the form of positive ions in the boundary layer to the outside of the electrode 100. If the charge is not completely transferred, a residual charge remains in the electrode 100 to develop an electric field which reduces the amount of charge which can be transferred from the positive ions to the electrode 100. An electric field on the inside of the electrode 100, in this manner, would tend to reduce the flow of ions from the boundary layer through the electrode 100. The electric field within the electrode 100, however, is maintained at zero intensity by substantially fully enclosing the electrode 100 and by compensating for the openings 130 and an opening 132 (in FIGURE 6) formed between the flanges 150 and 151 about the supporting cone-shaped portion 121 of the cylindrical member 101. The electric field compensation is provided by providing an opening between two flanges 148 and 149 of the sections 140 and 141 at the back of the electrode 100. In other words, the two flanges 148 and 149 do not meet when the two sections 150 and 151 are affixed. A rectangular opening is provided between the flanges 148 and 149 which provides for an electric field distortion or component to compensate for the component or distortion introduced by the openings 130 and the opening 132. The electrode 100, therefore, though having a number of openings, actually four as described above, functions as if it were a fully enclosing structure for the positive charges brought to its interior in the form of the positive ions in the boundary layer. Due to the fully enclosing effect, the electrode 100 functions essentially as a highly efficient electrostatic brush for picking up the positive charges developed by the triboelectric voltage effect between the two members 101 and 102.

As illustrated particularly in FIGURE 6, the mesh 143 of the electrode 100, which attracts and picks up the positive charges, is electrically connected to two anodes 71 and 73 at opposite sides of the triboelectric generator 30. The anode 73 is supported by the casing 105 in contact with the electrode 100 and the anode 71 is supported by the casing 106 also in contact with the electrode 100. The anode 71 is pointed and the anode 73 is hemispherically shaped in that its end surface is in the form of a hemisphere. The particular shape of a high potential electrode determines the potential at which the air in its vicinity is ionized. The anode 71 is pointed to discharge positive ions in its vicinity, and the anode 73 is shaped hemispherically to prevent the generation of positive ions in its vicinity.

As shown in FIGURES 2 and 3, the anode 73 is positioned in the ionizing chamber 42 and the electrode 71 is positioned in the charging chamber 43. The anode 71 is positioned opposite a hemispherically shaped cathode 70 which is supported by and electrically connected to the top of the chassis, or housing, 11. The anode 71 and the cathode 70 are spaced apart by a distance less than one and a half inches. As described above, the resilient member 102 provides a negative charge through the terminal strip 109 to the chassis, and a positive charge is provided from the electrode 100 to the anode 71. In this manner, due to the triboelectric effect in the generator 30, a relatively high potential difference is developed between the cathode 70 and the anode 71. Illustratively, potentials between 5 and 15 thousand volts may readily be developed depending upon the insulation resistance and the sparkling potential of air and also the particular shape of the anode 71.

At a particular potential, determined by the shape of the anode 71, the air at the electrode 71 becomes positively ionized. The exact potential at which the positive ions are generated relates to the sharpness of the electrode 71. The sharper or more pointed is the electrode 71, the lower is the corona discharge and the greater the field intensity at the point. The electrode 71 is relatively pointed to provide for a relatively low discharge potential, illustratively at 5000 to 7000 volts, to reduce electrical leakages through the triboelectric generator 30. The higher the required potential between the electrodes 70 and 71, the higher are the potentials developed in the triboelectric generator 30 and the greater are the electrical leakage losses therein. The casing sections 105 and 106 enclosing the various components in the triboelectric generator 30, for this reason, provide for sealed enclosure to prevent dust, moisture or other components from entering the generator 30 and increasing thereby the surface leakage. The sealed enclosure also prevents positive ions in the generator 30 from exiting into the chambers 42 and 43. The generator 30, as described above, is separated by insulators from any conductive components of the chassis 11 except for the connection by the terminal strip 109 in order to reduce electrical leakages between the anodes 71 and 73 in the cathodes 70 and 72.

By mounting the cathode 70 on the housing 11, under certain circumstances the generation of positive ions is somewhat more efficient. The exact reason for the increased efficiency is not clear but, if the cathode is at the resilient member 102 and the anode is coupled to the housing 11, a slightly smaller amount of ions are generated. If the cathode 71 was pointed, and the anode 70 was hemispherically shaped, negative ions would be generated at the cathode instead of positive ions at the anode.

As described above, in the charging chamber 43, air is drawn through the bottom opening 20 and passes through the charging chamber 43 into the mixing chamber 46. The air through the opening 20 includes dust, moisture and other airborne particles and the positive ions generated by the triboelectric generator 30 at the electrodes 71. The electric field produced by a point charge is highest at a region contiguous to the point (the electrode 71) and decreases with the square of the distance from the point. The positive ions produced by a silent electrical discharge from the anode 71 are all accordingly contained in the region close to the anode 71. Only the dust particles in the air passing close to the electrode 71, accordingly, are charged by the positive ions. The air in the charging chamber 43 consists then of a stream of air with a high concentration of ions moving in unionized air like smoke discharged into moving air. The positive ions all being similarly charged, repel each other and tend to disperse through the moving air in the charging chamber 43. Some of the positive ions combine with the dust particles causing them to be positively charged. The dust and positive ions carried in the primary air are entered to the mixing chamber 46. The surfaces of the dust charging chamber 43 may be covered by an insulating material such as a varnish made of Teflon material or made of a Kel-F material so that the ions are not absorbed in the various surfaces forming the dust charging chamber 43. The external surfaces of the motor 21 may be similarly coated with an insulating material. The stream of air adjacent the pointed electrode 71 removes the positive ions from the immediate vicinity of the electrode so that further generation of positive ions is not inhibited. There is an optimum air velocity across the electrode 71 for generating a maximum amount of positive ions.

The air which entered the opening 20 and now includes the positive ions is referred to herein as primary air. The primary air is pulled through the circular opening 79 in the partition 49 by the centrifugal fan 32. The centrifugal fan 32 has a bushing 161, shown particularly in FIGURE 9, which is mounted on the motor shaft 23. A set screw 162 through the bushing 161 affixes the fan 32 to the shaft 23. The fan 32, accordingly, is rotated at the motor speed of 1500 revolutions per minute. The fan 32 forms a low efficiency turbine blower system which turbulently mixes the primary air from the charging chamber 43 with secondary air drawn into the mixture chamber through the external opening 38 in the back panel 13 covered by a screen 172. The diffusion provided by the fan intimately mixes the ion bearing air with the neutral air both of the primary and secondary airs in order to charge the dust particles in the neutral air. If the fan 32 is made more inefficient to further increase the turbulence and, therefore, the mixing effect, it increases the noise. Approximately three times as much secondary air is drawn into the mixing chamber 46 as is primary air due to the operation of the fan 32 due to the relative size of the openings into the fan 32.

Referring again to FIGURE 9, the fan 32 includes a number of blades 160 which are shaped to direct the air in a clockwise manner, as depicted in FIGURE 4. The portion of the blades 160 parallel to the opening 79 between the chambers 43 and 46 restricts the effective size of the opening to the chamber 46. A smaller amount of air is accordingly drawn in from the chamber 43 than through the opening 38. The present invention is not, however, restricted to such a relationship as the amount of primary air may be the same or even greater than the amount of secondary air. In fact, if the amount of the primary and secondary airs are equal, the turbulence is somewhat increased to facilitate the diffusion of the positive ions.

The primary and secondary airs are driven around a passageway in the mixing chamber 46 by the fan 32. A shroud 50 in the mixing chamber 46 shapes the passageway for the mixing air adjacent the blade 32. As shown in FIGURE 4, the fan shroud 50 provides for a clockwise increasing turbine space about the fan 32. Ideally, the shroud 50 could provide for a developed curve surface to provide for gradually increasing turbine space instead of a discontinuously increasing turbine space in order to increase the efficiency of the fan 32. The particular shape of the shroud 50, however, is not critical as considerable turbulence is desired in any event.

The primary and secondary airs mixed by the fan 32 are carried in a clockwise direction through the passageway increasing until the starting point of the shroud 50 is attained. The starting point of the shroud 50 is at a flange lip 51 which extends over the panel or partition 54. The partition 54 is positioned alongside a section 53 of the partition 49, as shown in FIGURE 3. Between the lip 51 and the top of the chassis 11 is formed a rectangular opening 40 through which the mixing air from the chamber 46 is forced into the plenum chamber 45. As the primary and secondary airs are turbulently diffused in the mixing chamber 46, the positive ions and charged dust particles in the primary air contact the dust particles in the secondary air so that the positive charge diffuses to the dust in the secondary air as well as the primary air. The inside surfaces of the mixing chamber 46 and the surfaces of the fan 42 may be coated with an insulating material in a similar manner as are the surfaces in the dust charging chamber 43 to prevent the attraction of any of the particles in the chamber 46 to its internal surfaces.

One of the reasons for utilizing a double air entry with openings 20 and 38 is to facilitate the economic use of a single motor 21 for driving both the triboelectric generator 30 and the fan 32. With a single motor, the most compact arrangement is to locate the motor 21 in the chamber with the inlet air to the fan. If all of the air enters the fan from the motor side, it is necessary to provide a substantial space between the motor and the fan inlet to pass the air. To provide this space, it would also be necessary to have a long motor shaft to the fan so that balance and bearing wear problems are materially increased. Moreover, by increasing the length of the motor shaft, the size of the ionizer housing 11 must be increased. To avoid these difficulties, a double inlet centrifugal fan 32 is employed which can be positioned relatively close to the motor 21. Only a small space is required to pass the primary air to the chamber 46.

Providing a double inlet also facilitates the diffusion of the ion bearing air with the neutral air in both primary and secondary airs. The diffusion is facilitated by the contra flow of the two airs.

In the plenum chamber 45, the mixing of the air continues as the air expands in the chamber 45 to further diffuse the positive charges. The air passage area is substantially increased in the plenum chamber 45 and right angle turns are provided to increase the mixing. The substantially lower air velocity increases the mixing time to also facilitate further mixing. The internal surfaces of the plenum chamber 45 may also be coated with an insulating material. The plenum chamber 45 has as its first opening, the opening 40 from the mixing chamber 46, and the only exit for the mixed air in the plenum chamber 45 is through the filter 85, which was briefly mentioned above.

As shown particularly in FIGURE 3, the filter 85 is a rectangularly shaped member which is held in position by two upper slide mounts 86 mounted against the top chassis 11 and two lower slide mounts 88 mounted on the bottom of the chassis 11. The filter 85 is locked in position by a locking plate 60, shown also in FIGURE 2, which is mounted on a flange of the section 53 by a screw and nut 61. The filter 85 may be a disposable filter in that it is relatively inexpensive and may be readily removed from the air ionizer and purifier 10 for replacement by removing the locking plate 60. The filter 85 has a rectangular cardboard frame 89 which may be coated and impregnated with a conductive rubber coating. The frame 89 supports two metallic screens 90 which may be a type of wire screen referred to as chicken wire or which may be a punched out thin metal sheet. The metallic portions forming the screens 90 may be spaced at substantial distances relative to the dimensions of the charged dust. The two screens 90 support a cheap fibrous material 92 such as wood fiber or excelsior fill or Spanish moss therebetween.

The fibers 92 are relatively coarse fibers and function by electrostatic attraction to remove the positively charged dust particles. The wood fibers 92 are coated with a conductive material which may illustratively be a conductive rubber adhesive, with the conductive additive illustratively being carbon black. The charged particles in the mixed air from the plenum chamber 45 are electrostatically precipitated on the conductive coating of the wood fibers 92. The charged particles are also trapped by an impingement filtering action. Coarse threads such as wood fibers may be utilized because the filtering is by electrostatic precipitation as well as impingement with the charged particles being attracted to the grounded coated fibers.

Most domestic filters are of the impingement type wherein the dust impaction depends on the inertial deposition of dust particles as the air passes around an obstruction. The filters are usually of cellular construction and are filled with fibers arranged transversely to the air flow. The fibers used are spun-glass, vegetable fibers, animal hair or iron, aluminum or copper wool. Viscous type filters have an oil coating on the fibers. The impaction of dust increases rapidly as the fiber diameter is reduced and as the air velocity thru the filter is increased. For this reason, the fibers used in impingement type filters are very fine filaments of considerable strength. The maximum fiber diameter is governed by the minimum size of the dust particles which are to be caught in the interstices of the filter mesh.

The impingement filter is more efficient with larger particles, and electrostatic filters, on the other hand, are more efficient with small particles. The filter 85 combines the advantages of both phenomena of inertial impaction and electrostatic attraction. The electrostatic attraction is provided by utilizing a high potential difference between the dust and the fibers 92. The greater the potential difference, the greater the attraction. It is for this reason that positive ions are utilized to charge the dust when the filter 85 is grounded with the negative electrodes 70 and 72 of the triboelectric generator 30.

The conductivity required by the fibers 92 and provided by the conductive rubber coating is actually quite low because of the minute quantity of electrons which must pass through the filter 85. Because of the conductivity and resultant ion attraction, the fibers can be coarse. American excelsior has a thickness of about 0.016 inch and is $\frac{1}{32}$ of an inch wide. Japanese excelsior is 0.005 inch thick and $\frac{1}{16}$ of an inch wide. The coating of the fibers serves the function of sealing them as well as providing the conductivity in order to prevent decay of the fibers.

The conductive rubber adhesive has another function because it supports activated carbon particles which are dispersed on the rubber adhesive. The activated carbon particles are not necessary for the electrostatic precipitation though being conductive assists such precipitation, but function to remove odor bearing materials and vapors carried by the mixed air. Impure air not only contains particulate matter, but foreign gases as pollutants. Gaseous pollutants can be removed most easily by adsorption Adsorption is the phenomena of surface attractions universal with all substances. Activated charcoal or carbon is the only adsorbent that can be used for control of atmospheric odors, smog and other gaseous pollutants due to its preferential adsorption of organic material. Previously adsorbed moisture will be displaced from the carbon surface as the organic vapors are adsorbed. The overall adsorption efficiency of activated carbon is practically 100 percent. Activated carbon granules are graded in terms of mesh sizes. Commercial odor filters are usually supplied in cellular form and quite often consist of 6 to 14 mesh granules held in thin beds between screens or perforated sheets of metal. The problem in using the activated carbon as a filter medium is similar to trying to arrange sand in a thin bed and pass air thru it without excessive resistance which would require high air pressure. The material is also relatively expensive so that efficient utilization is desired. The commercial construction requires the use of very large granules, namely $\frac{1}{4}$ to $\frac{3}{8}$ of an inch in diameter, and a rigid frame to prevent the granules from shifting. Another type uses small granules contained in porous paper tubes with air spaces between tubes of about $\frac{3}{8}$ of an inch. A third type employs a grid of paperboard strips about $\frac{1}{16}$ of an inch by $\frac{1}{2}$ of an inch wide spaced about $\frac{3}{8}$ of an inch. The strips are coated with activated carbon dust, and are used with a dust filter. The ionizer 10 of this invention provides gaseous pollutant filtration by a novel means which avoids the disadvantages of the existing types. The ideal arrangement is to distribute relatively small granules (of a size about $\frac{1}{32}$ of an inch) in a maze with air passages of similar size to those in an impingement filter. The size of the inexpensive excelsior fibers range from $\frac{1}{32}$ to $\frac{1}{16}$ of an inch wide and, therefore, are of the same order of thickness as the size of activated carbon which has an optimum combination of performance and cost.

The activated carbon granules used are preferably approximately 0.020 inch in diameter and are deposited on the adhesive coating of the air filter 85 immediately after the adhesive is sprayed on. Since the effectiveness of odor adsorption is reduced by accumulations of dust on the activated carbon, the activated carbon granules could be applied to the exit side of the filter 85 since most of the particulate matter will collect in the interstices of the upstream section of the filter 85.

The portion of the granule surface which is in contact with this rubber cement is not available for gaseous adsorption and the granules are not spherical but are somewhat oblong. It is also desirable to coat as much of the surface of the wood fibers as possible which would require the granules to approach the adhesive coated fibers from all directions. This result can be accomplished by taking advantage of the conductivity of the conductive rubber coating. During the manufacture of the filter 85, after the carbon particles have been dispersed on the conductive rubber adhesive and before the rubber adhesive solidifies, a high voltage plate is placed adjacent to the coated wood fibers to cause the carbon particles to stand on end. This electrostatic effect of standing particles on end is of the type utilized in manufacturing sandpaper. The lines of flux in an electric field meet a conductive surface orthogonally. The use of electrostatic attraction will, therefore, provide two desirable effects: first the particles will align themselves along the lines of force and will present their ends to the adhesive rather than to their sides; and second, the field will fill all of the surface of the adhesive coated fibers with carbon granules. By aligning the carbon particles in this manner, the filtering surfaces for the vapors in the mixed air are, accordingly, increased. The air through the filter 85, in this manner, is relatively dust free due to the electrostatic precipitation, and is also relatively odor free due to the effect of the activated carbon.

The air is forced through the filter 85 into the ionizing chamber 42 where it is mixed with negative ions developed by the triboelectric generator 30. As described above, the triboelectric generator 30 generates ions both in the charging chamber 43 and in the ionizing chamber 42. The ions generated in the chamber 43, however, are positive ions and the ions generated in the chamber 42 are negative ions. The negative ions generated in the chamber 42 are generated between the hemispherical anode 73 and the pointed cathode 72 which is mounted on and electrically connected to the upper panel of the housing 11. The two electrodes 71 and 73 are spaced apart by a distance somewhat less than 1½ inches. The negative ions in the ionizing chamber 42 disperse in the chamber 42 and are carried by the purified air from the filter 85 as a stream of smoke is carried by moving air through the chamber 42 and out through the opening 14 at the front of the housing 11. The internal surfaces of the ionizing chamber 42 and of the grill 15 may also be coated with an insulating material. The air through the opening 14 and the grill 15 at the front of the chassis, or housing 11 is, in this manner, purified having dust, moisture and other airborne particles and odor bearing vapors removed and is ionized as well carrying the negative ions generated in the ionizing chamber 42.

Although this invention has been disclosed and illustrated with reference to particular applications, the principles involved are susceptible of numerous other applications which will be apparent to persons skilled in the art. For example, in the specific embodiment described above, the cylindrical member 101 is made of Marlex 50 or Teflon and the resilient member 102 is made of fiberglass. As pointed out above, the principles of this invention are not restricted to such combination. In another specific embodiment of the invention, the cylindrical member 101 is molded of glass of high resistivity and the resilient member 102 is made of Teflon fibers which are available in the form of a loosely woven fabric. Since other materials do not readily adhere to Teflon, it is necessary to bondize the surface of the fibers in order to attach a conductive coating. This is accomplished by suspending free active sodium in a non-aqueous liquid and immersing the Teflon fibers therein. The sodium attacks the Teflon fiber producing a brown surface which is essentially free carbon. The free carbon is conductive and, if desired, additional conductivity can be obtained by coating the free carbon with conductive materials in the manner described above for coating the glass fiber embodiment.

In this specific embodiment, the two members 101 and 102 are reversed with respect to their order in the Teflon electric series. When the cylindrical member 101 is rotated, it now acquires a positively charged surface, and the resilient Teflon fiber member 102 now becomes charged negatively. The high intensity field at the surface of the Teflon fibers attracts positive ions formed in the region adjacent to these fibers. The high intensity field is formed at the Teflon fibers because of their small radius of curvature in relation to the large radius of curvature in the oppositely charged cylindrical member 101. Because of the high energy of the electric field adjacent the Teflon fibers, the positive ions acquire substantial energy and bombard the conductive surface of the fibers to release electrons. The released electrons move toward the oppositely charged glass cylindrical member 101 and attach themselves in their migration thereto to oxygen molecules to form negative ions. When the negative ions reach a region in which the air is experiencing a drag by the fast moving glass surface of the member 101, they are carried as part of the boundary layer to the hollow metal electrodes 100.

The operation of the thermoelectric generator 30 in this embodiment is then quite similar to that described above except that the polarities of the electrodes and of the ions in the boundary layer are reversed. For this embodiment, however, the electrode arrangement in the chambers 43 and 42 are different. If the resilient member 102 is grounded, it is the relatively positive terminal that is grounded so that the ions in the charging chamber 43 as well as in the ionizing chamber 42 should be of negative polarity. The reason for the utilization of negative ions in the chamber 43 is to charge the dust particles negatively because the filter 85 is grounded or at the relatively positive potential. To provide negative ions in the chamber 43, the negative electrode 71 is pointed and the positive electrode 70 is grounded.

If, however, the negative electrode 100 is grounded instead of the resilient member 102, positive ions are required in the chamber 43 and negative ions in the chamber 42. For this modification, the electrode structure in the chambers 43 and 42 are identical as depicted in FIGURE 2. By utilizing positive ions in the chamber 43, the full potential difference developed by the generator 30 is available at the filter 85 for attracting the dust particles.

It is evident, therefore, that the principles involved in this invention are susceptible of numerous applications. The invention, therefore, is to be limited only as indicated by the scope of the appended claims.

I claim:

1. A triboelectric generator for generating ion particles, including, a rotatable member made of plastic, a resilient member made of a fibrous mesh of insulating material of a type providing for a triboelectric potential upon contact with the plastic forming said rotatable member, a layer of conductive material covering at least a portion of the fibers forming the fibrous mesh of said resilient member for removing any charges developed on the fibrous mesh due to its contact with said rotatable member, means coupled to said rotatable member for continuously rotating said rotatable member to successively contact said resilient member with different portions of said rotatable member to develop charges of opposite polarity on said members, and a hollow electrode enclosing a portion of said rotatable member and through which the successive portions of said rotatable member are passed as said rotatable member rotates for developing a cumulative charge having the same polarity as the charge developed on said rotatable member.

2. A triboelectric generator, including, a first insulating member having a porous structure, a second insulating member having a substantially nonporous structure and being movable adjacent said first insulating member, said second insulating member being made of a different insulating material than said first insulating member so as to develop a triboelectric potential therebetween, means coupled to said second insulating member for moving said second member to successively contact portions of said second member with a portion of said first insulating member to develop a charge on the porous structure of said first member adjacent said second member whereby the air in the porous structure of said first member adjacent said second member is ionized and carried along as a charged boundary layer with said moving second member, and an electrode coupled to said second member and forming an opening for receiving the charged boundary layer developed at said first member to generate a potential related to the charge carried by the charged boundary layer.

3. A triboelectric generator in accordance with claim 2 wherein, said electrode includes an insulator member positioned against said second member in the path of the charged boundary layer to deflect it away from the moving second member, and a mesh made of a conductive material to which the charged boundary layer is directed for developing a charge on the mesh related to the charge carried by the charged boundary layer.

4. A triboelectric generator in accordance with claim 2 wherein, said electrode forms a second opening for compensating for the electric field caused in the inside of said electrode due to the opening which receives the charged boundary layer so that the electrical field intensity within said electrode is substantially zero as if said electrode formed a fully enclosing structure.

5. A triboelectric generator, including, a first insulating member having a porous structure, a second insulating member having a substantially nonporous structure and being movable adjacent said first insulating member, said second insulating member being made of a different insulating material than said first insulating member so to develop a triboelectric potential therebetween, means coupled to said second insulating member for moving said second member to successively contact portions of said second member with a portion of said first insulating member to develop a charge on the porous structure of said first member adjacent said second member whereby the air in the porous structure of said first member adjacent said second member is ionized and carried along as a charged boundary layer with said moving second member, an electrode coupled to said second member and forming an opening for receiving the charged boundary layer developed at said first member to generate a potential related to the charge carried by the charged boundary layer, said electrode having an insulator member positioned against said second member in the path of the charged boundary layer to deflect it away from the moving second member, and a mesh made of a conductive material to which the charged boundary layer is directed for developing a charge on the mesh related to the charge carried by the charged boundary layer, an anode electrically coupled to said mesh of said electrode upon which a potential of one polarity is developed, and a cathode electrically connected to said first insulating member upon which a potential of opposite polarity is developed, said cathode being spaced apart from said anode whereby ions are generated in the space between said anode and said cathode.

6. A triboelectric generator, including, a first insulating member having a porous structure, a second insulating member having a substantially nonporous structure and being movable adjacent said first insulating member, said second insulating member being made of a different insulating material than said first insulating member so as to develop a triboelectric potential therebetween, means coupled to said second insulating member for moving said second member to successively contact portions of said second member with a portion of said first insulating member to develop a charge on the porous structure of said first member adjacent said second member whereby the air in the porous structure of said first member adjacent said second member is ionized and carried along as a charged boundary layer with said moving second member, an electrode coupled to said second member and forming an opening for receiving the charged boundary layer developed at said first member to generate a potential related to the charge carried by the charged boundary layer, said porous structure of said first member being partially filled with a conductive material for removing any charges on said first member developed by the contact of successive portions of said second member, and an electrode electrically connected to said conductive material of said first member and positioned in proximity to said first mentioned electrode for generating ions between them.

7. A triboelectric generator for generating negative ions, including, a pair of insulating members each made of a different insulating material to be able to develop a contact potential when brought into contact with each other, means for continuously rotating one of said members adjacent the other to successively present portions of said one member in contact with said other member, the material forming said one member being lower in the triboelectric series than the material forming said other member so that a negative charge is developed on the successive portions of said one member and a positive charge is developed on said other member, the insulating material forming said other member being in the form of a fibrous mesh defining a porous surface contacted by the successive portions of said other member whereby the air in the porous surface is positively ionized and the positively ionized air is carried along the negatively charged portions of said one member as they successively contact and move away from said other member, means for receiving the positively charged air positioned along the rotating path of the negatively charged portions of said one member and for accumulating a positive charge by discharging the positively charged air, and an ion discharge electrode electrically coupled to said other member upon which a negative charge is developed due to the positive ionization of the air at the porous surface of said other member.

8. A triboelectric generator for generating negative ions, including, a pair of insulating members each made of a different insulating material to be able to develop a contact potential when brought into contact with each other, means for continuously rotating one of said members adjacent the other to successively present portions of said one member in contact with said other member, the material forming said one member being lower in the triboelectric series than the material forming said other member so that a negative charge is developed on the successive portions of said one member and a positive charge is developed on said other member, the insulating material forming said other member being in the form of a fibrous mesh defining a porous surface contacted by the successive portions of said other member whereby the air in the porous surface is positively ionized and the positively ionized air is carried along the negatively charged portions of said one member as they successively contact and move away from said other member, means for receiving the positively charged air and positioned along the rotating path of the negatively charged portions of said one member and for accumulating a positive charge by discharging the positively charged air, a conductive material covering at least a portion of fibers forming the fibrous mesh of said other member for removing negative charges developed on the fibrous mesh due to the positive ionization of the air in its porous surface, and an ion discharge electrode electrically coupled to said other member in electrical contact with the conductive material covering the portion of the fibers forming the fibrous mesh.

9. Apparatus for generating negative ions substantially free from positive ions in air at atmospheric pressure, including, a first member made of an insulator mesh with conductive material coating said mesh and adapted to serve as a cathode, a second member made of a solid insulating material different from the insulating material forming the insulator mesh, means coupled to said second member for moving said second member against said first member to generate a stream of positive ions starting in the insulator mesh adjacent the second member, and a hollow electrode for receiving the stream of positive ions and adapted to serve as an anode whereby a potential difference is developed between the cathode and anode.

10. A triboelectric generator, including, a first insulating member having a porous structure, a second insulating member having a substantially nonporous structure and being movable adjacent said first insulating member, said second insulating member being made of a different insulating material than said first insulating member so as to develop a triboelectric potential therebetween, means coupled to said second insulating member for moving said second member to successively contact portions of said second member with a portion of said first insulating member to develop a charge on the porous structure of said first member adjacent said second member whereby the air in the porous structure of said first member adjacent said second member is ionized and carried along as a charged boundary layer with said moving second member, an electrode coupled to said second member and forming an opening for receiving the charged boundary layer developed at said first member to generate a potential related to the charge carried by the charged boundary layer, said electrode including an insulator member positioned against said second member in the path of the charged boundary layer to deflect it away from the moving second member, and a resilient mesh made of conductive material to which the charged boundary layer is directed for developing a charge on the mesh related to the charge carried by the charged boundary layer, said resilient mesh being restrained in said electrode to force said insulator member against said second member to counterbalance the effect of the contact of said first member against said second member.

References Cited by the Examiner

UNITED STATES PATENTS

| | | | |
|---|---|---|---|
| 2,183,387 | 12/39 | Anderson | 250—43 |
| 2,248,713 | 7/41 | Locke | 21—74 |
| 2,282,770 | 5/42 | Sarver. | |
| 2,318,093 | 5/43 | Penney. | |
| 2,371,044 | 3/45 | Folmer | 21—74 |
| 2,372,437 | 3/45 | Lathrop et al. | |
| 2,572,765 | 10/51 | Roudaut | 310—7 |
| 2,579,445 | 12/51 | Warburton | 55—138 X |
| 2,610,699 | 9/52 | Penney. | |
| 2,610,994 | 9/52 | Bosch et al. | 310—6 |
| 2,706,016 | 4/55 | Schlumbohm. | |
| 2,791,182 | 5/57 | Scheidl | 230—108 |
| 2,822,058 | 2/58 | Roos et al. | |
| 2,841,242 | 7/58 | Hall. | |
| 2,933,151 | 4/60 | Kurtz. | |
| 3,053,028 | 9/62 | Kayko | 55—103 |
| 3,105,750 | 10/63 | Kayko | 55—103 |

HARRY B. THORNTON, *Primary Examiner.*

HERBERT L. MARTIN, ROBERT F. BURNETT, WESLEY S. COLE, *Examiners.*